(12) United States Patent
Shibata et al.

(10) Patent No.: US 6,387,253 B1
(45) Date of Patent: May 14, 2002

(54) SOLID-LIQUID SEPARATING DEVICE

(75) Inventors: Masahito Shibata, Aichi-ken; Yasuhiro Sugimura, Shimizu; Shigetaka Hisada, Tokoname; Kazuhiko Kawamura, Gifu; Toshiro Asaoka, Inayama, all of (JP)

(73) Assignee: Food Machinery Development Co., Ltd., Nagoya (JP)

( * ) Notice: Subject to any disclaimer, the term of this patent is extended or adjusted under 35 U.S.C. 154(b) by 0 days.

(21) Appl. No.: 09/505,675

(22) Filed: Feb. 17, 2000

(30) Foreign Application Priority Data

Feb. 17, 1999 (JP) .............................................. 11-038759

(51) Int. Cl.[7] .............................. B04B 3/00; B01D 35/18
(52) U.S. Cl. ................. 210/179; 210/360.1; 210/380.1; 494/13; 494/36
(58) Field of Search ............................... 210/179, 360.1, 210/380.1, 774, 787; 494/13, 36

(56) References Cited

U.S. PATENT DOCUMENTS 4,052,304 A * 10/1977 Verstenstein ............. 210/360.1
4,718,945 A * 1/1988 Schaper et al. ........... 210/380.1
6,143,170 A * 11/2000 Briggs et al. ................ 210/179

* cited by examiner

Primary Examiner—David A. Reifsnyder
(74) Attorney, Agent, or Firm—Dennison, Scheiner & Schultz

(57) ABSTRACT

The solid-liquid separating device 10 is capable of separating a concentrated liquid from a slurry by centrifugation and includes a centrifugation unit 12 having a rotating vessel 15 with a porous outer wall surface through which liquid is transmissible and a heater unit 18. Preferably, a portion of the slurry to be treated that is closest to a central axis of rotation of the centrifugation unit 12 is heated by the heater unit 18 during the centrifugation.

23 Claims, 4 Drawing Sheets

SOLID-LIQUID SEPARATING DEVICE

BACKGROUND OF THE INVENTION

1. Field of the Invention

The present invention relates to freeze-concentrating techniques for liquids, such as brines, fruit juices, coffee extracts or enzyme extracts. More particularly, it relates to techniques for separating target components from water (ice) in frozen substances and slurries and recovering concentrates of the target components.

2. Description of the Related Art

Freeze-concentrating methods are known for preparing concentrated liquid substances from liquids, such as brines, fruit juices, coffee extracts or enzyme extracts. In known freeze-concentrating methods, a crude liquid is frozen under low-temperature conditions in order to generate a slurry containing ice and a portion containing concentrated target components. Then, the ice and the concentrate are separated. According to this method, the amount of energy required to concentrate the target components can be reduced to approximately ⅟₇th of the amount of energy that is required for evaporation methods. Moreover, because the concentration steps are performed at low temperatures, denaturation of concentrates owing to heat or desorption of aromatic components can be reduced. Accordingly, known freeze-concentrating methods can be used to prepare high quality concentrated components (concentrated fruit juices, etc.) from diluted liquids, such as fruit juices or coffee extracts, while minimizing the amount of energy necessary to perform the concentration method.

Typical steps for concentrating fruit juice using known freeze-concentrating methods will now be summarized with reference to FIG. 5. First, a dilute liquid 1, such as fruit juice, is cooled to an appropriate low-temperature range, i.e., a temperature that is below the freezing point of water, to form a slurry 2. Target components that were contained in the dilute liquid 1 can be fractionated in a substantially uniform manner from the slurry 2, thereby generating a liquid concentrate. That is, by freezing the dilute liquid 1, a slurry 2 is prepared that contains a solid matter portion (hereinafter referred to as an "ice portion") and a concentrated liquid portion. Thereafter, the slurry 2 including the concentrated portion and the ice portion is transferred to a centrifuge 3 and centrifuged to separate the liquid contents from the ice portion. In this manner, the slurry 2 is separated into the ice portion and a liquid concentrated portion 4.

When separating a concentrated portion from a slurry, such as fruit juice, it is important to minimize the loss of the target components. For instance, when a liquid such as fruit juice is frozen, the target components usually adhere to the ice portion or the target components remain occluded within the interior of the ice portion. Therefore, it is necessary to attempt to efficiently recover the target components that remain adhered to the ice portion or that are occluded within the ice portion.

Known methods for recovering such concentrated portions are, for instance, (1) melting the ice portion that remains after centrifugation and repeating the freezing process and the centrifugation process (that is, repeating the freeze-concentrating process) and (2) washing the surface of the ice portion with a dilute liquid or water, whereupon the target components are recovered within the washing liquid.

However, repeatedly performing freezing-centrifugation processes results in troublesome and time-consuming freeze-concentrating processes as a whole and is thus economically disadvantageous. Further, washing the surface of the ice portion of the slurry with a dilute liquid or water and recovering the washing liquid presents a drawback in that, while a portion of the target components that were adhering to the ice portion can be recovered, the addition of the washing liquid results in an increased volume of the concentrated components or in decreased concentrating efficiencies. Therefore, a long-felt need exists for a new means that is capable of minimizing the loss of concentrated components in freeze-concentrating techniques (i.e., improved target component recovery rates), while maintaining high concentrating efficiencies.

SUMMARY OF THE INVENTION

It is, therefore, one object of the present teachings to provide improved freeze-concentrating techniques. In one aspect, known problems relating to the recovery of concentrated components are overcome by providing new methods for performing freeze-concentrating processes. In another aspect, new devices are taught that are capable of rapidly recovering concentrated target components that are adhering to an ice portion or that are occluded within the ice portion, while maintaining high concentrating efficiencies.

In a representative embodiment, a rotor unit is taught that comprises a rotating vessel having an outer wall surface through which liquids can be transmitted and a heater unit. The heater unit may be disposed within the rotor, such that the portion of the slurry/ice portion that exists within the rotating vessel closest to the central rotational axis of the rotating vessel is heated by the heater unit. In this manner, the liquid generated from the ice portion that is melted by the heater unit will be transmitted through the ice portion within the rotating vessel to wash out concentrated components adhering to the ice portion before being exhausted from the rotating vessel.

Thus, the portion of the slurry that is closest to the central axis of rotation may be partially melted by means of heat supplied from the heater unit while centrifuging the slurry that remains in the rotating vessel. That is, the ice portion in the slurry can be washed by the melted liquid generated by melting of some of the ice portion of the slurry. Consequently, separation and recovery of the concentrated components that have adhered to the ice portion of the slurry can be efficiently performed.

By using such a rotor unit, it is no longer necessary subject the slurry to a washing liquid (i.e., water or a dilute liquid, such as fruit juice), as is the case for known freeze-concentrating techniques.

In another aspect of the present teachings, the rotor unit is designed, such that liquids discharged through the outer wall surface of the rotating vessel are maintained within the rotor unit during the centrifugation step. According to this design, liquids that have been discharged through the outer wall surface of the rotating vessel can be simply stored in the rotor unit and thus, it is possible to reduce the amount of loss of volatile components as a result of desorption of the volatile components in the concentrated liquid recovered from the slurry (for instance, concentrated fruit juice). Optionally, a liquid transmitting tube can be disposed within the rotor unit to transfer liquid that has been stored in the reservoir unit to the exterior.

In another aspect of the present teachings, a solid-liquid separating device is described that has a supply tube disposed within the rotor unit and that permits the slurry to be introduced into the rotating vessel. In the alternative or in addition to, a discharge tube also may be provided to discharge the remaining ice portion after centrifugation. If both of these features are included, the slurry/ice portion can be easily and smoothly supplied to and recovered from the recovery vessel.

Methods for preparing concentrated components from a dilute liquid are also taught. In a representative method, a slurry that contains an ice portion and a concentrated liquid portion may be centrifuged while heating the slurry. The concentrated components are then recovered. Thus, a concentrated portion is separated from the ice portion. By partially melting the ice portion through heating, concentrated components adhering to the surface of the ice portion can be separated from the ice portion by centrifugal force.

In the alternative, the slurry may be subjected to a first centrifugation without heating and the resulting concentrated portion is recovered. The slurry remaining in the centrifuge can then be subjected to a second centrifugation with heating, and the additional resulting concentrated portion is recovered.

Preferably, during the centrifugation step, the concentrated portion that has been separated from the slurry is maintained within the rotor unit. By maintaining the concentrated portion within the rotor unit during the centrifugation process, it is possible to prevent the concentrated portion from being exposed to the atmosphere outside of the rotor unit. Importantly, this design and method prevents the concentrated portion from being exposed to the atmosphere between the rotor unit and inner wall of the centrifuge housing, where the concentrate portion can rapidly evaporate. Therefore, degradation of the quality of the concentrated components can be minimized.

DETAILED DESCRIPTION OF THE INVENTION

Each of the additional features and constructions disclosed above and below may be utilized separately or in conjunction with other features and constructions to provide improved solid-liquid separation devices and methods for designing and using such solid-liquid separation devices. Detailed representative examples of the present invention, which examples utilize many of these additional features and constructions in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

Figure 1:
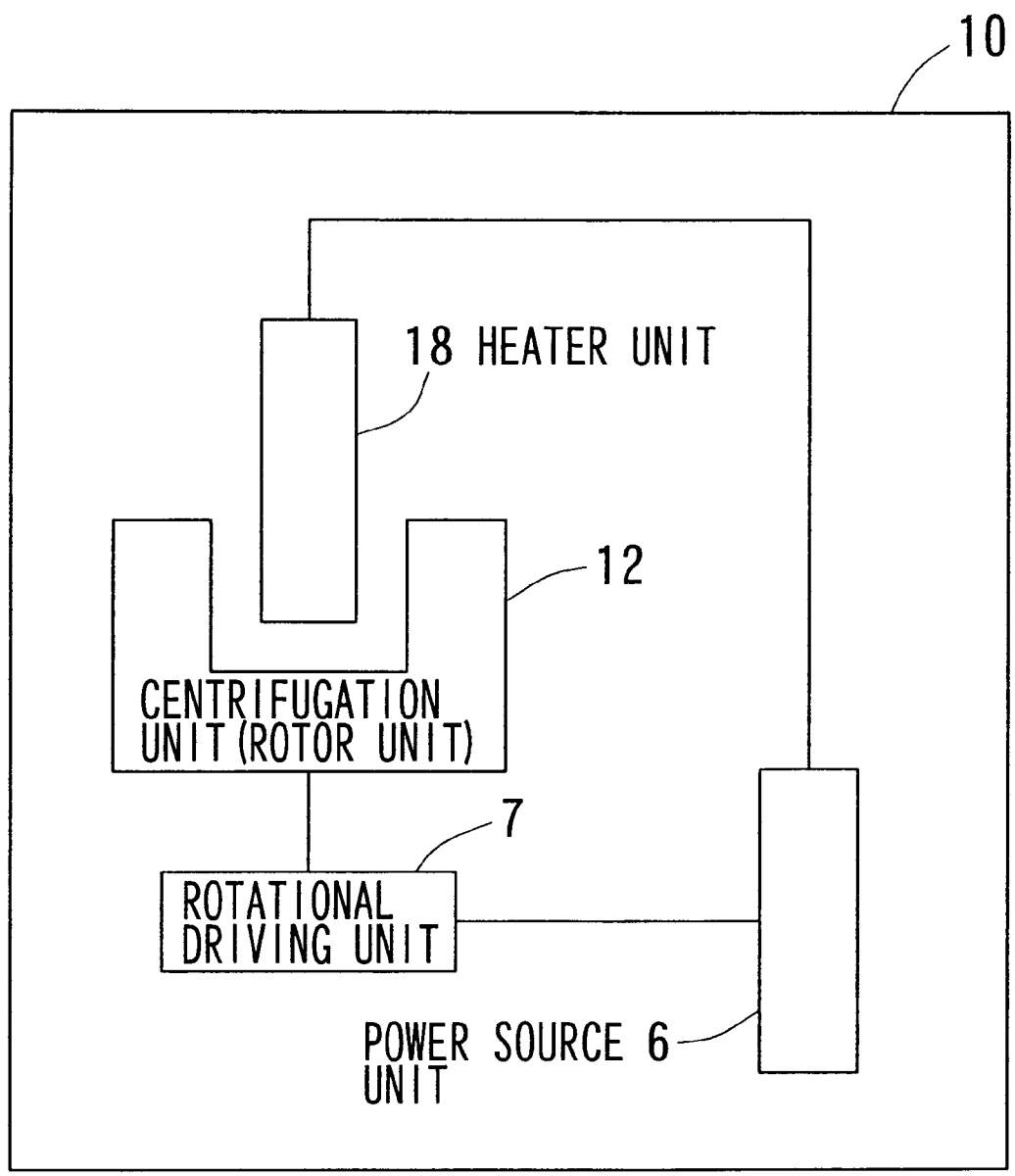
FIG. 1 is a block diagram schematically showing an overall arrangement of a preferred solid-liquid separating device.

A first representative embodiment of a preferred solid-liquid separating device will now be explained with reference to FIG. 1 and FIG. 2. As schematically shown in FIG. 1, the solid-liquid separating device generally includes a centrifugation unit 12, a heater unit 18, a power source unit 6 and a rotational driving unit 7. The power source unit 6 supplies electric power to the heater unit 18 and the rotational driving unit (motor unit) 7. A control unit may be provided in the power source unit 6 so as to permit a user to adjust the voltage level. As a result, the amount of electric power supplied to the heater unit 18 and the rotational driving unit 7 may be suitably adjusted. The rotational driving unit 7 is connected to a rotor portion within the centrifugation unit 12 that will be discussed below (a rotating portion, such as a rotating vessel 15, also will be described below).

Figure 2:
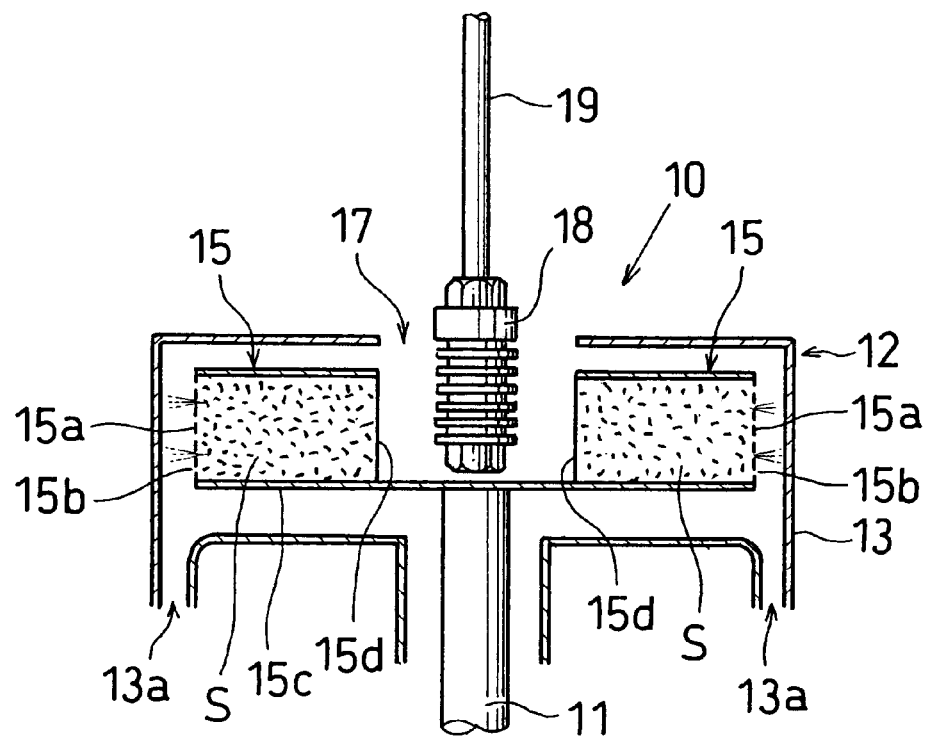
FIG. 2 is a sectional view schematically showing a cut away portion of a first representative solid-liquid separating device.

FIG. 2 shows a more detailed arrangement of the heater unit 18 and the centrifugation unit 12. The solid-liquid separating device 10 of FIG. 2 is arranged similarly to a general centrifugal dewatering device, in that a rotor unit or cylindrical rotating vessel 15, which is basically a basket in form, is provided within a housing 13 and the housing 13 can be sealed when the rotating vessel 15 rotates. Thus, the rotating vessel 15 according to the embodiment as illustrated in FIG. 2 has a hollow cylindrical shape with a hole 17 formed in a central portion, thereby forming a doughnut-like shape when viewed from above. An inner wall portion 15d of the rotating vessel 15, which corresponds to an edge portion of the central hole 17, is preferably a wire net (mesh plate) made, for instance, of stainless steel. The outer wall surface of the hollow cylindrical rotating vessel 15 preferably includes a porous outer wall plate 15a (preferably made of a metallic plate, such as a stainless steel plate) having holes 15b through which liquid may be transmitted. With this arrangement, liquid residing within the rotating vessel 15 can be discharged to the outside of the rotating vessel 15 via the holes 15b in the outer wall plate 15a during the centrifugation (dewatering) operation. Moreover, in this representative embodiment, an optional liquid transmitting outlet 13a is formed in a bottom portion of the case 13. Liquid that has been discharged from the rotating vessel 15 during the centrifugation operation can be transmitted to the outside of the solid-liquid separating device 10 through this liquid transmitting outlet 13a.

A bottom plate portion 15c of the rotating vessel 15 may have a circular plate shape and a rotational driving axis 11 may be connected to the central portion of the plate portion 15c. The rotational driving axis 11 communicates with the rotational driving unit 7. With this arrangement, the hollow cylindrical rotating vessel 15 can be rotationally driven at a desired rotational speed by the rotational driving unit 7.

As illustrated in FIG. 2, the heater unit 18 is provided at the end of a supporting axis 19 that provides an electrical connection to the power source unit 6. The heater unit 18 shown in FIG. 2 comprises a heating wire coil and a radiation metallic plate. However, a variety of heater units may be used with the present teachings.

Preferably, the heater unit 18 is disposed such that the heater unit 18 heats the portion of the slurry/ice portion within the rotating vessel 15 that is closest to the central axis of rotation. Therefore, the heater unit 18 is preferably disposed at a position corresponding to the central axis of rotation when the rotating vessel 15 is rotating (a position along a central axial direction of a rotating body (image) that is drawn in space by the rotating vessel 15 in a rotating condition, and the same applies hereinafter) or at a position proximate to the central axis.

In addition, in the representative embodiment shown in FIG. 2, the supporting axis 19 is disposed so that it is suspended above the center of the rotating vessel 15. The supporting axis 19 is aligned with respect to the rotational driving axis 11, so that the heater unit 18 is consequently disposed at a central portion of the central hole 17. With this arrangement, the portion of the slurry, which has accumulated in the rotating vessel 15 while the rotating vessel 15 is rotating, that is closest to the central axis of rotation may be heated (a portion proximate to the inner wall 15*d*).

A representative method for separating an ice portion from a concentrated portion of target components contained within the slurry using the solid-liquid separating device 10 of FIG. 2 will now be described. First, a slurry including concentrated liquid components is produced, for example, by super-cooling fruit juice to a temperature that is slightly lower than its freezing point (hereinafter referred to as "iced object S"), and is placed in the hollow cylindrical rotating vessel 15 within the housing 13 via a supply inlet (not shown). Preferably, an upper lid 15*e* covers the rotational vessel 15 to prevent the iced object S from overflowing.

The rotating vessel 15 corresponding to a rotor unit of the solid-liquid separating device 10 (accumulating body for the slurry) is then rotated to centrifuge the slurry, preferably at a centrifugal effect Z of 400 or more. Z is calculated according to the following formula:

$$Z=\omega^2 r/g = V^2/g \; r = \pi^2 N^2 r/900g$$

Wherein, r=diameter of rotation [m],
ω=angular velocity [rad/sec]
V=peripheral velocity [m/sec]
N=number of rotations per unit time [rpm]
g=gravity [m/sec$^2$]

The concentrated liquid components of the fruit juice that separate from the surface of the iced object S are discharged to the outside of the vessel 15 via the holes 15*b* in the porous outer wall plate 15*a* and the liquid concentrate may be recovered. A second centrifugation is then performed and the heater unit 18 turned on to supply heat to the portion of the iced object S that is proximate to the wire net-like inner wall 15*d* while the centrifugation is being performed. The portion of the iced object S proximate to the heater unit 18 will melt to generate a liquid and the liquid will pass through the iced object S as a result of the centrifugal force applied to the liquid. Accordingly, the iced object S within the rotating vessel 15 will be washed by the melted liquid. That is, the melted liquid produced proximately to the wire net-like inner wall 15*d*, which portion is closest to the central rotational axis of the rotating vessel 15 and the heater unit 18, is forced to move due to the centrifugal force towards the outer wall surface side along the surfaces of the iced object S. This movement of the liquid results in washing of the iced object S.

Accordingly, by using the solid-liquid separating device 10, a portion of the iced object S is melted by heating and the surface of the iced object S is washed with the melted liquid. This washing effect causes further concentrated components to be separated from the iced object S, which concentrated components are not ordinarily recovered using known centrifugation techniques. Therefore, the concentrated liquid that has been melted is discharged to the outside of the vessel 15 via the holes 15*b* in the porous outer wall plate 15*a* together with melted water. The discharged concentrated liquid is transmitted to the exterior via the liquid transmitting outlet 13*a*.

It should be noted that upon completion of the centrifugation operation, including the heating and washing treatments, the iced object S remaining within the rotating vessel 15 may be removed using various kinds of scrapers or by infusing water so that the residue is discharged as a dilute slurry.

As explained thus far, according to the solid-liquid separating device 10 of the present embodiment, it is possible to effectively separate and recover concentrated target components that adhere to an iced object S. It is further possible to effectively wash the ice portion in a centrifugal direction by using a melted portion of the iced object S. With this arrangement, the concentrated components that are separated from the iced object S will not be excessively diluted. Thus, by using the solid-liquid separating device 10 according to the first representative embodiment, concentrated components may be efficiently obtained from a dilute liquid material, such as fruit juice.

Figure 3:
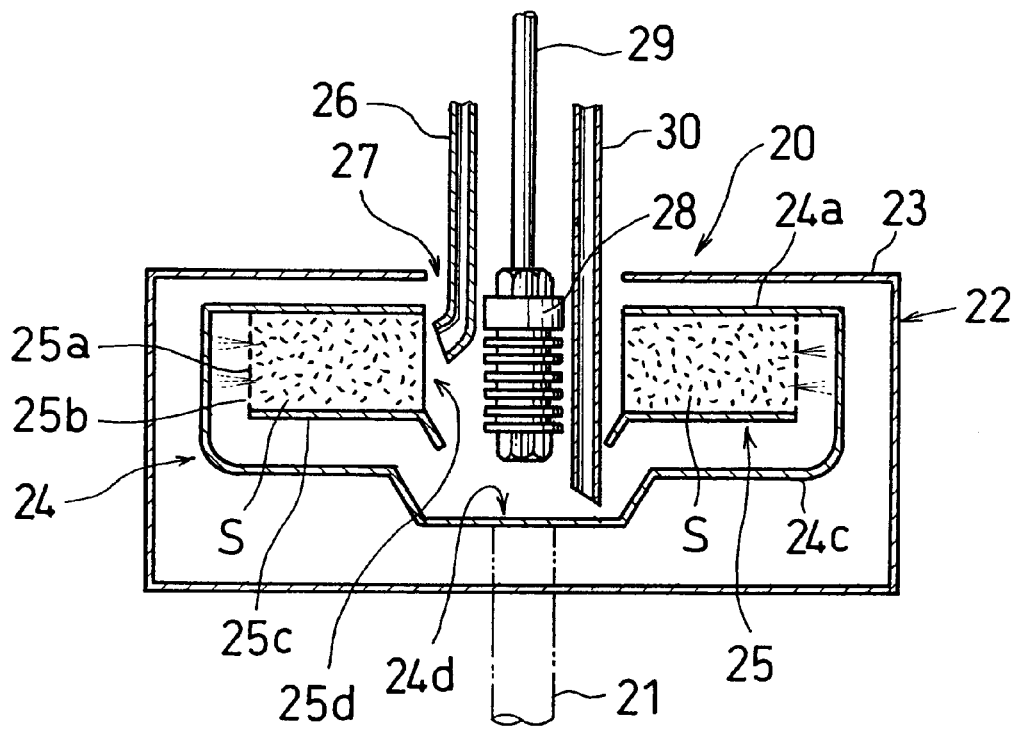
FIG. 3 is a sectional view schematically showing a cut away portion of a second representative solid-liquid separating device.

A second representative embodiment is shown in FIG. 3, which comprises a reservoir unit and a liquid transmitting tube. It should be noted that generally the overall arrangement of a solid-liquid separating device 20 according to this second representative embodiment is the same as FIG. 1.

As illustrated in FIG. 3, the centrifugation unit 22 is arranged, such that a hollow cylindrical rotor unit 24 (that serves as an accumulating body for a slurry as well as an accumulating body of a rotating vessel 25 for directly holding the slurry) is disposed within a cylindrical housing 23. In addition, the rotor unit 24 has a hollow cylindrical rotating vessel 25 that uniformly surrounds a central hole portion 27 at its circumferential edge portion. That is, as shown in FIG. 3, an outer wall surface of the rotating vessel 25 includes a porous outer wall plate 25*a* having holes 25*b* through which liquid can be transmitted, similar to the first representative embodiment. At a lower end portion of the outer wall plate 25*a*, a bottom plate portion 25*c* is disposed that comprises a doughnut-shaped circular plate having a central aperture corresponding to the central hole. An upper end portion of the porous outer wall plate 25*a* is fixedly attached to an upper surface portion 24*a* of the rotor 24.

Thus, the rotating vessel 25 comprises the upper surface portion 24*a* of the rotor 24, the porous outer wall plate 25*a* and the circular-shaped bottom plate portion 25*c*. While the rotating vessel 25 does not include a structure that corresponds to the above-described inner wall 15*d*, a portion 25*d* extending from an inner edge portion of the upper surface portion 24*a* of the rotor 24 to an inner edge portion of the bottom plate portion 25*c* is open. Therefore, it is possible to fill the iced object S into the rotating vessel 25 via the central hole 27 as well as the open portion 25*d*.

No aperture is formed in the bottom surface portion 24*c* of the rotor 24 according to the second representative embodiment. Instead, the bottom surface is shielded from the exterior to assume a vessel-like shape. Specifically, the bottom surface portion 24*c* of the rotor 24 has a concave portion at a central position that substantially corresponds to the central hole 27. As further described below, this concave portion corresponds to a reservoir unit 24*d* according to this embodiment. The bottom surface portion 24*c* at a periphery of the reservoir unit 24*d* also has a gentle slope to assume a bowl-like cross-section so that liquid disposed within the bottom surface portion 24c will flow into the reservoir unit 24d along this slope. With this arrangement, the liquid disposed within the reservoir unit 24d is not readily exposed to the atmosphere outside of the rotor unit 24. Moreover, a rotational driving axis 21 that communicates with the rotational driving unit 7 is connected to a central lower surface side of the bottom surface portion 24c (that is, a central lower surface side of the reservoir unit 24d). With this arrangement, the rotor 24 can be rotated at a desired rotating speed together with the rotating vessel 25 and together with the rotational driving unit 7.

As shown in FIG. 3, a heater unit 28 is again provided, which heater unit 28 may be similar to the above-described heater unit 18, at the end of a supporting axis 29. The heater unit 28 is aligned with the rotational driving axis 21 and is disposed at a position corresponding to a central axis of rotation when the rotating vessel 25 is rotating, that is, at the central portion of the central hole 27. Again, in the second representative embodiment, the heater unit 28 is positioned to heat the portion of the iced object S that is closest to the central axis of the rotor 24, as in the first representative embodiment.

The solid-liquid separating device 20 further comprises a supply tube 26 and a liquid transmitting tube 30, in which tip end portions are inserted into and disposed at the central hole 27 from the exterior. In the second representative embodiment, the supply tube 26 serves to supply the iced object S into the rotating vessel 25, and as shown in FIG. 3, its open tip end portion is directed into the open portion 25d of the rotating vessel 25. With this arrangement, the iced object S can be filled from the exterior into the rotating vessel 25 during centrifugation. That is, the iced object S can be discharged through an aperture in the tip of the supply tube 26 for supplying the iced object S to the open portion 25d of the rotating vessel 25. In this manner, the supplied iced object S moves toward the outer wall plate 25a due to the centrifugal force generated in the rotating vessel 25. Therefore, by continuously filling the slurry/iced object S into the supply tube 26, the iced object S can be filled into the rotating vessel 25. Thus, this design permits the user to fill iced object S into the rotating vessel 25 in a uniform manner and to improve the washing efficiency, as will be explained below.

A liquid transmitting tube 30 also may be provided in the solid-liquid separating device 20 and serves as a tube for transmitting liquids that have been stored in the reservoir unit 24d. The liquid transmitting tube 30 is preferably connected to a suction pump (not shown). In addition, an open tip end portion of the liquid transmitting tube 30 is disposed close to the bottom of the reservoir unit 24d. With this arrangement, liquid that has accumulated within the reservoir unit 24d can be effectively withdrawn and transmitted to the exterior.

A representative method for separating an ice portion and a concentrated portion of target components using the second representative embodiment will now be described. Similar to the first embodiment, the thick slurry-like iced object S is supplied from the supply tube 26 to the rotating vessel 25 during rotation and is filled into the rotating vessel 25 in a uniform manner. Thereafter, centrifugation treatment is performed at a centrifugal effect Z of 400 or more by rotating the rotor 24. When rotation of the rotor 24 is terminated upon completion of the centrifugation operation, the concentrated liquid flows from the inner wall of the rotor 24 into the reservoir unit 24d and is temporarily stored in the reservoir unit 24d. Thereafter, the suction pump is actuated to draw out the concentrated liquid disposed within the reservoir unit 24d via the liquid transmitting tube 30.

During centrifugation, the concentrated liquid that has been discharged from the vessel 25 into the rotor 24 will not be discharged to outside of the rotor 24, but instead will be maintained disposed along the inner lateral surface side of the rotor 24 due to the centrifugal force applied to the liquid. Thus, the concentrated liquid is not exposed to the atmosphere between the inner wall of the housing 23 and the rotor 24 in this embodiment. Because the airflow generated by the rotating rotor 24 can evaporate volatile components, loss of volatile components from the recovered concentrated liquid (e.g., concentrated fruit juice) can be reduced and a high quality concentrate can be obtained.

The slurry/iced object S remaining in the rotor 24 may be subjected to a second centrifugation treatment at a centrifugal effect Z of 400 or more, while heating a proximate portion of the iced object S within the rotating vessel 25 during centrifugation. With this arrangement, the iced object S within the rotating vessel 25 is washed, similar to the above-described embodiment, and the concentrated components adhering to the ice portion of the iced object S can be melted out.

The concentrated liquid that has been melted in the present embodiment is discharged together with melted liquid to the outside of the rotating vessel 25 via the holes 25b in the porous outer wall plate 25a.

When rotation of the rotor 24 is terminated upon completion of the centrifugation operation, including the heating and washing treatments, the concentrated liquid will flow from the inner wall of the rotor 24 into the reservoir unit 24d. Thereafter, the suction pump is actuated to transmit the concentrated liquid that is temporarily stored in the reservoir unit 24d to the exterior via the liquid transmitting tube 30.

Thus, according to the second representative embodiment, separation and recovery of concentrated components adhering to the iced object S can be effectively performed, similar to the first representative embodiment. Further, in the second representative embodiment, the concentrated liquid that has been discharged from the outer wall surface of the rotating vessel 25 is stored within the reservoir unit 24d of the rotor 24 without directly transmitting the same to the exterior of the device until the completion of centrifugation. Thus, the opportunity for and the amount of the concentrated liquid contacting the atmosphere is minimized and loss of volatile components from the recovered concentrated liquid (e.g., concentrated fruit juice) can be reduced. Therefore, the solid-liquid separating device 20 according to the present embodiment enables the performance of freeze concentrating techniques to produce concentrated liquids of high quality.

Figure 4:
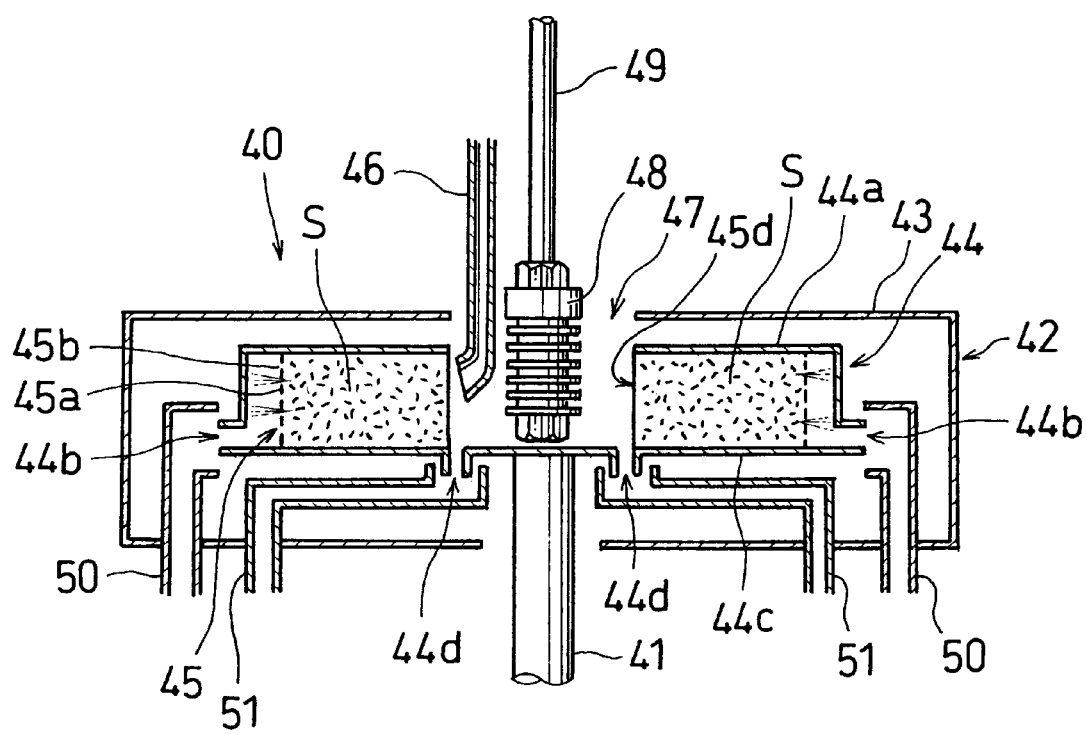
FIG. 4 is a sectional view schematically showing a cut away portion of a third representative solid-liquid separating device.
Figure 5:
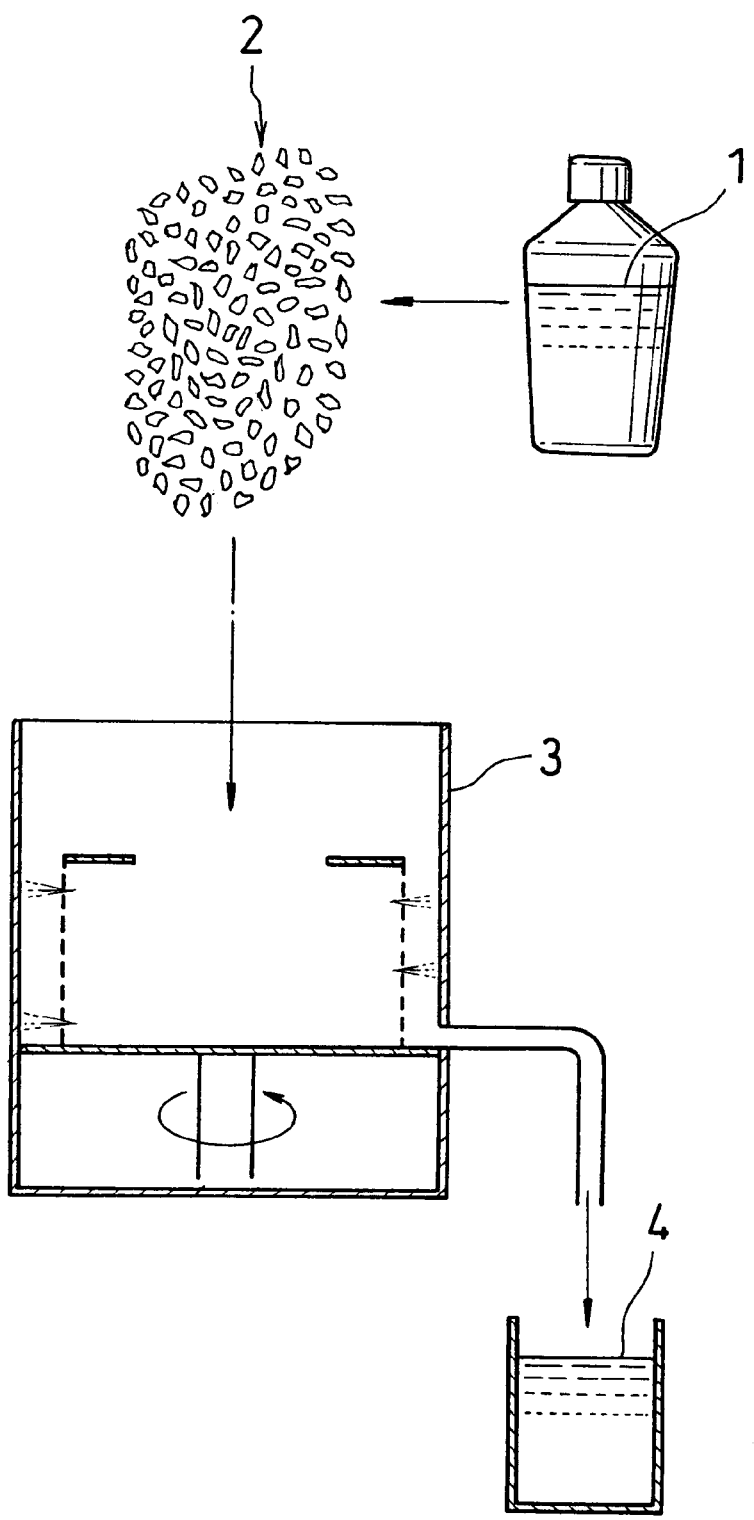
FIG. 5 is a flowchart schematically showing a known freeze concentrating process.

In a third representative embodiment, a supply tube for supplying an object to be treated into the rotating vessel and a discharge tube for discharging the treated object from the rotating vessel are independently provided. The overall arrangement of the solid-liquid separating device 40 is similar to FIG. 1. As illustrated in FIG. 4, the centrifugation unit 42 of the solid-liquid separating device 40 is arranged such that a hollow cylindrical rotor 44 is disposed within a cavity of a cylindrical housing 43. In addition, the rotor 44 has a uniformly formed hollow cylindrical rotating vessel 45 that surrounds a central hole portion 47 at its circumferential edge portion. That is, as shown in FIG. 4, an outer wall surface of the rotating vessel 45 has a porous outer wall plate 45a having holes 45b through which liquid is transmissible, similar to the first embodiment.

While an upper end portion of the outer wall plate 45a is fixedly attached to an upper surface portion 44a of the rotor 44, its lower end portion is fixedly attached to a bottom surface portion 44c of the rotor 44. In this manner, the rotating vessel 45 comprises the upper surface portion 44a of the rotor 44, the porous outer wall plate 45a and a bottom surface portion 44c of the rotor 44. It should be noted that a portion 45d extending from an inner edge portion of the upper surface portion 44a of the rotor 44 to an inner edge portion of the bottom surface portion 44c is open, similar to the second embodiment. Therefore, it is possible to fill the iced object S into the rotating vessel 45 via the central hole 47 as well as this open portion 45d. It should be noted that a supply tube 46, which has the same functions and shape as the supply tube 26 of the second embodiment, is provided at the central hole 47 as shown in FIG. 4. With this arrangement, the iced object S can be supplied into the rotating vessel 45 during rotation through the supply tube 46.

A discharge outlet 44d is formed at the bottom surface portion 44c of the rotor 44 at a position substantially extending along an outer edge portion of the central hole 47, and a discharge tube 51 for receiving the residual treated object (e.g., a slurry-like iced object S that will be further described below) that has been discharged through the discharge outlet 44d to the exterior is formed below it. A slit-like liquid transmitting outlet 44b is disposed at a lower end portion of the outer wall portion of the rotor 44 and a liquid transmitting tube 50 for transmitting liquids (e.g., concentrated components that have been separated from the iced object S by centrifugation) that have sprayed out from the liquid transmitting outlet 44b to the exterior is provided outside thereof. Moreover, the discharge tube 51 and the liquid transmitting tube 50 are connected to a suction pump (not shown). With this arrangement, the slurry to be treated and the liquid that has been centrifuged can be respectively withdrawn in an effective manner via the discharge tube 51 and the liquid transmitting tube 50 in order to be transmitted to the exterior.

As shown in FIG. 4, a heater unit 48 is provided in a manner similar to the first and second representative embodiments.

A representative method for separating an ice portion and a concentrated portion of target components using the third representative embodiment will now be described. A thick slurry-like iced object S may be supplied from the supply tube 46 to the rotating vessel 45 during rotation and filled into the rotating vessel 45 in a uniform manner. Thereafter, the rotor 44 of the solid-liquid separating device 40 is rotated and centrifugation treatment is performed at a centrifugal effect Z of 400 or more. The concentrated liquid that has been fractionated from the slurry is discharged to the outside of the rotating vessel 45 via the holes 45b of the porous outer wall plate 45a. The concentrated liquid is thereafter discharged through the discharge outlet 44b of the rotor 44 due to the centrifugal force and is transmitted to the exterior via the liquid transmitting tube 50.

A second centrifugation is performed while the heater unit 48 applies heat to a proximate portion of the iced object S. As in the first and second representative embodiments, the iced object S within the rotating vessel 45 is washed and the concentrated components adhering to the ice portion of the iced object S can be melted out. The concentrated liquid that has been melted is discharged to the outside of the rotating vessel 45 via the holes 45b in the porous outer wall plate 45a together with the melted water. The concentrated liquid is thereafter discharged through the discharge outlet 44b of the rotor 44 due to the centrifugal force and is transmitted to the exterior through the liquid transmitting tube 50.

As explained thus far, according to the solid-liquid separating device 40, separation and recovery of the concentrated components adhering to the iced object S can be performed in an effective manner, and the iced object S can be rapidly exchanged or replaced due to the mutually independently arranged supply tube 46 and the discharge tube 51, thereby contributing to shortening of time required for treatments throughout the freeze concentrating process. Further, because the liquid transmitting tube 50 for transmitting the concentrated liquid and the discharge tube 51 for discharging residues of the iced object S are separately provided, recovery of concentrated liquid and residues of the iced object S can be easily performed.

While the first, second and third representative embodiments have been explained in detail, the present invention is not limited to the above forms and various modifications may be made.

For instance, although the rotating vessel 15 of the solid-liquid separating device 10 according to the first embodiment has a hollow cylindrical shape with a wire net-like inner wall 15d, the invention is not limited to this shape as long as the arrangement is such that a portion of an object to be treated, which is accumulated within the rotating vessel while the rotating vessel is rotating that is closest to the central axis of rotation, can be heated by the heater unit. For instance, the rotating vessel may have a cylindrical basket shape. Even when the arrangement is provided with a rotating vessel of such a shape, similar effects as those of the solid-liquid separating device 10 according to the first embodiment can be achieved by disposing the heater unit proximate to the central axis of rotation and accumulating and depositing the iced object around thereof in a hollow cylindrical manner so as to surround the heater unit (that is, similarly to the second and third embodiment).

Alternatively, while the rotating vessels 15, 25, 45 are supported in an upright manner with respect to the rotational driving axes 11, 21, 41 in the centrifugation units 12, 22, 42 in each of the embodiments, the invention is not limited to this shape, and they may also be supported in a suspended manner. In addition, a plurality of rotating vessels of a swinging-rotor type may be provided. The rotating portion (the rotating vessel or rotor) of the centrifugation unit may also be arranged to be attachable/detachable by a belt or the like instead of being directly connected to the rotational driving axis.

With respect to the second embodiment, the invention is not limited to the above form. For instance, while the reservoir 24d is formed at the central portion of the bottom surface portion 24c of the rotor 24 in the second embodiment, the invention is not limited to this arrangement, and the reservoir may also have groove-like shape that is disposed along an outer edge portion of the bottom surface portion 24c of the rotor 24.

While the heater unit is disposed either at a position corresponding to the central axis of rotation when the rotating vessel is rotating or a position proximate to the central axis in each of the embodiments, the invention is not limited to this disposing position unless a portion of the object to be treated, which is accumulated in the rotating vessel when the rotation vessel is rotating, that is closest to the central axis of rotation can be heated by the heater unit. For instance, the heater unit may be provided above or below the cylindrical rotating vessel. A heat reflecting plate may be provided at a central portion of the rotating vessel (a position corresponding to the central axis of rotation) that is capable of directing heat to a portion of the object to be treated that is closest to the central axis of rotation while reflecting heat that has been irradiated from the heater unit by means of the heat reflecting plate.

As long as the object of the present invention may be achieved thereby, it is possible to add elements to the solid-liquid separating device of the present invention in addition to the specified elements of the invention as recited in each of the claims. For instance, a cooling mechanism capable of cooling the interior of the rotor may be separately provided, similarly to a low-temperature centrifuge used for performing general studies and experiments. With this arrangement, the concentrated liquid that is retained within the reservoir unit 24d can be cooled so that desorption of volatile components can be further reduced.

Several experiments were performing using the solid-liquid separating device 20 of the second representative embodiment, whereby concentrated liquids having millet jelly components were recovered from millet jelly aqueous solutions. These results are described below.

EXAMPLE 1

A slurry-like iced object of a 42.0% (density of sugar) millet jelly aqueous solution and ice crystals having an average diameter of 0.3 mm was used as a crude material. In this example, the weight ratio of the millet jelly aqueous solution and ice crystals was set to be approximately 7:3. Ice crystals having the above-described average diameter can be obtained using known methods (such as the methods discussed in, for instance, Japanese Patent Application Publication No. 6-28560 (1994)).

The iced object was collected and filled into the rotating vessel 25 of the centrifugation unit 22 as shown in FIG. 3. As a first step, centrifugation treatment was performed at a centrifugal effect Z of approximately 400 for one minute and the liquid concentrate was recovered. As a second step, while heating with the heater unit (1200W) 28, centrifugation treatment was performed at a centrifugal effect Z of approximately 400 for five minutes and then another centrifugation treatment was performed without heating at a centrifugal effect Z of approximately 400 for five minutes. In Comparative Example 1, a slurry-like iced object of a 41.7% (density of sugar) millet jelly aqueous solution and ice crystals having an average diameter of 0.3 mm (its weight ratio was identical to that of Example 1) underwent centrifugation treatments using the same conditions as the above first step, but was not subjected to the second heating and centrifugation step.

The following tests were performed on the recovered concentrated liquids and the remaining iced object in the rotor:

(a) melting rate of the ice crystals: a ratio (wt %) of the ice portion (in grams) that was melted by the heating and centrifugation treatments with respect to the total amount of the iced portion disposed within the slurry-like iced object that was originally placed into the rotating vessel;

(b) adhesive rate of the concentrated liquid: a ratio (wt %) of the millet jelly concentrated liquid (in grams) that adhered to the iced portion with respect to the total amount of the ice portion within the slurry-like iced object that was placed into the rotating vessel, after completing all the centrifugation treatments; and (c) recovery rate of adhering liquid: a ratio (wt %) of the millet jelly concentrated liquid that was separated and recovered by the centrifugation treatments in the case in which heating was performed on the total millet jelly concentrated liquid (g) that remained adhering to the ice portions of the slurry-like iced object remaining in the rotating vessel after the centrifugation treatment without heating was performed (the first step). The results are shown in Table 1.

TABLE 1

|  | Example 1 | Comparative Example 1 |
| --- | --- | --- |
| Density of millet jelly (wt %) | 42.0 | 41.7 |
| Melting rate of ice crystals (wt %) | 44.6 | 0.0 |
| Adhesive rate of concentrated liquid (wt %) | 0.5 | 9.6 |
| Recovery rate of adhering liquid (wt %) | 98.4 | — |

As is evident from Table 1, by performing heating treatments and centrifugation treatments using the solid-liquid separating device 20 of the present teachings (FIG. 3), 44.6% of the ice portion of the slurry-like iced object could be melted and as much as 98.4% of the entire amount of millet jelly concentrated liquid that was adhering to the ice portion could be recovered. On the other hand, as is evident from Comparative Example 1, it is impossible to recover millet jelly concentrated liquid that is adhering to the ice portion, if heating treatments are not performed.

In this manner, by using the solid-liquid separating device of the present teachings, millet jelly concentration and recovery of the concentrated components free of losses (improving recovery rates) can both be achieved.

EXAMPLE 2

A slurry-like iced object of a 57.5% (density of sugar) millet jelly aqueous solution and ice crystals having an average diameter of 0.3 mm was used as a crude material. The weight ratio of the millet jelly aqueous solution and ice crystals was similar to that of Example 1.

The iced object was collected and filled into the rotating vessel 25 of the centrifugation unit 22 as shown in FIG. 3. While heating with the heater unit 28, centrifugation treatment was performed at a centrifugal effect Z of approximately 400. As Comparative Example 2, a slurry-like iced object of a 58.9% (density of sugar) millet jelly aqueous solution and ice crystals having an average diameter of 0.3 mm (its weight ratio was identical to that of Example 1) underwent centrifugation treatments using the same conditions without performing heating treatments using the heater unit 28.

Example 2 and Comparative Example 2 were also tested for (a) melting rate of ice crystals (wt %), (b) adhering rate of concentrated liquid (wt%), and (c) recovery rate of adhering liquid (wt %), and the results are shown in the following Table 2.

TABLE 2

|  | Example 2 | Comparative Example 2 |
| --- | --- | --- |
| Density of millet jelly (wt %) | 57.5 | 58.9 |
| Melting rate of ice crystals (wt %) | 40.6 | 0.0 |
| Adhering rate of concentrated liquid (wt %) | 1.4 | 21.4 |
| Recovery rate of adhering liquid (wt %) | 96.9 | — |

As is evident from Table 2, further concentrating of the millet jelly aqueous solution and improvements in recovery rate were again both achieved, similar to Example 1, with the slurry iced object of high density. That is, by performing heating treatments and centrifugation (dewatering) treatments using the solid-liquid separating device 20 of the present teachings (FIG. 3), 40.6% of the ice portion of the slurry-like iced object could be melted and as much as 96.9% of the entire amount of millet jelly concentrated liquid that was adhering to the ice portion could be recovered. On the other hand, as is evident from (b) adhering rate of concentrated liquid (21.4%) of the Comparative Example 2, such millet jelly aqueous solutions of high density are highly viscous, so that the ratio of concentrated liquid fraction adhering to the ice portion also was high.

In the past, it was difficult to recover such concentrated liquid fractions at a high efficiency by merely performing centrifugal dewatering in a known manner. However, by employing the solid-liquid separating devices according to the present teachings, it is possible to perform freeze concentrating in an effective manner as well as to recover concentrated components at a high efficiency, even if a millet jelly aqueous solution of high density is used.

What is claimed is:

1. A solid-liquid separating device adapted to separate a liquid from a slurry containing ice and liquid by centrifugation, comprising:
   a rotor unit including a rotating vessel having a porous outer wall surface through which liquids can be transmitted, the rotating vessel having a rotational axis; and
   an electrical heating unit disposed proximately to the rotational axis of the rotating vessel, wherein the electrical heating unit is constructed and arranged such that radiated heat from the electrical heating unit melts a portion of the ice within the slurry that is disposed closest to the rotational axis of the rotating vessel during centrifugation.

2. A solid-liquid separating device as in claim 1, wherein the rotating vessel further comprises means for storing liquids within the rotating vessel during centrifugation.

3. A solid-liquid separating device as in claim 2, wherein the liquid storing means is a reservoir unit that is constructed and arranged to rotate together with the rotating vessel during centrifugation.

4. A solid-liquid separating device as in claim 2, further comprising a liquid transmitting tube that is constructed and arranged to withdraw liquids that have been stored within the liquid storing means.

5. A solid-liquid separating device as in claim 1, further comprising:
   a supply tube for supplying the slurry into the rotating vessel; and
   a discharge tube for discharging any ice or slurry remaining within the rotating vessel after centrifugation and heating.

6. A solid-liquid separating device as in claim 1, further comprising a heat reflecting plate disposed proximately to the rotational axis of the rotating vessel, the heat reflecting plate being constructed and arranged to reflect radiated heat from the electrical heating unit towards a portion of the slurry that is disposed closest to the rotational axis of the rotating vessel during centrifugation.

7. A solid-liquid separating device as in claim 1, wherein the rotor unit is constructed and arranged to rotate the rotating vessel while the electrical heating unit is heating the slurry.

8. A solid-liquid separating device as in claim 1, wherein the electrical heating unit is constructed and arranged to heat the slurry without introducing any foreign substances into the slurry.

9. A solid-liquid separating device as in claim 1, further comprising a stationary rotor housing and a reservoir unit rotatably disposed within the rotor housing, the reservoir unit receiving the rotor unit and rotating together with the rotor unit within the rotor housing, wherein the reservoir unit is constructed and arranged to retain liquid transmitted through the porous outer wall surface of the rotating vessel during centrifugation, wherein the liquid received within the reservoir unit is not exposed to airflow generated between the reservoir unit and the rotor housing during centrifugation.

10. A solid-liquid separating device as in claim 9, further comprising a heat reflecting plate disposed proximately to the rotational axis of the rotating vessel, the heat reflecting plate being constructed and arranged to reflect radiated heat from the electrical heating unit towards a portion of the slurry that is disposed closest to the rotational axis of the rotating vessel during centrifugation, wherein the rotor unit is constructed and arranged to rotate the rotating vessel while the electrical heating unit is heating the slurry and the electrical heating unit is constructed and arranged to heat the slurry without introducing any foreign substances into the slurry.

11. A solid-liquid separating device as in claim 10, further comprising a cooling unit disposed proximately to an outer portion of the slurry disposed within the rotating vessel.

12. A solid-liquid separating device as in claim 1, further comprising a discharge outlet disposed proximately to the rotational axis of the rotating vessel and a discharge tube in communication with the discharge outlet, wherein the discharge outlet and the discharge tube are constructed and arranged to discharge any ice or slurry remaining within the rotating vessel after the slurry has been centrifuged and heated.

13. A solid-liquid separating device as in claim 12, wherein the rotor unit further comprises a liquid transmitting outlet formed on an outer surface of the rotating vessel and the solid-liquid separating device further comprises a liquid transmitting tube in communication with the liquid transmitting outlet, wherein the liquid transmitting outlet and the liquid transmitting tube are constructed and arranged to receive liquid that has been discharged through the porous outer wall surface of the rotating vessel.

14. A solid-liquid separating device as in claim 13, further comprising a heat reflecting plate disposed proximately to the rotational axis of the rotating vessel, the heat reflecting plate being constructed and arranged to reflect radiated heat from the electrical heating unit towards a portion of the slurry that is disposed closest to the rotational axis of the rotating vessel during centrifugation, wherein the rotor unit is constructed and arranged to rotate the rotating vessel while the electrical heating unit is heating the slurry and the electrical heating unit is constructed and arranged to heat the slurry without introducing any foreign substances into the slurry.

15. A solid-liquid separating device as in claim 14, further comprising a cooling unit disposed proximately to an outer portion of the slurry disposed within the rotating vessel.

16. An apparatus, comprising:
   a stationary rotor housing;
   a rotor unit rotatably disposed within the rotor housing, the rotor unit having a rotational axis and comprising a rotating vessel having a porous outer wall surface, the rotating vessel being constructed and arranged to receive a slurry containing ice and liquid; and
   means for heating a portion of the slurry that is proximal to the rotational axis of the rotor unit by converting electrical power into radiated heat and without introducing any foreign substances into the slurry.

17. An apparatus as in claim 16, further comprising a heat reflecting plate disposed proximately to the rotational axis of the rotating vessel, the heat reflecting plate being constructed and arranged to reflect radiated heat from the heating means towards a portion of the slurry that is disposed closest to the rotational axis of the rotating vessel during centrifugation, wherein the rotor unit is constructed and arranged to rotate the rotating vessel while the heating means is heating the slurry and the heating means heats the slurry without introducing any foreign substances into the slurry.

18. An apparatus as in claim 16, further comprising a reservoir unit rotatably disposed within the rotor housing, the reservoir unit receiving the rotating vessel and rotating together with the rotating vessel within the rotor housing, wherein the reservoir unit is constructed and arranged to retain liquid transmitted through the porous outer wall surface of the rotating vessel during centrifugation, wherein the liquid received within the reservoir unit is not exposed to airflow generated between the reservoir unit and the rotor housing during centrifugation.

19. An apparatus as in claim 18, further comprising a heat reflecting plate disposed proximately to the rotational axis of the rotating vessel, the heat reflecting plate being constructed and arranged to reflect radiated heat from the heating means towards a portion of the slurry that is disposed closest to the rotational axis of the rotating vessel during centrifugation, wherein the rotor unit is constructed and arranged to rotate the rotating vessel while the heating means is heating the slurry and the heating means heats the slurry without introducing any foreign substances into the slurry.

20. An apparatus as in claim 16, further comprising a discharge outlet disposed proximately to the rotational axis of the rotor unit and a discharge tube in communication with the discharge outlet, wherein the discharge outlet and the discharge tube are constructed and arranged to discharge any ice or slurry remaining within the rotor unit after the slurry has been centrifuged and heated.

21. An apparatus as in claim 20, wherein the rotor unit further comprises a liquid transmitting outlet formed on an outer surface of the rotating vessel and further comprising a liquid transmitting tube communicating with the liquid transmitting outlet, wherein the liquid transmitting outlet and the liquid transmitting tube are constructed and arranged to receive liquid that has been discharged through the porous outer wall surface of the rotating vessel.

22. An apparatus as in claim 21, further comprising a heat reflecting plate disposed proximately to the rotational axis of the rotating vessel, the heat reflecting plate being constructed and arranged to reflect radiated heat from the heating means towards a portion of the slurry that is disposed closest to the rotational axis of the rotating vessel during centrifugation, wherein the rotor unit is constructed and arranged to rotate the rotating vessel while the heating means is heating the slurry and the heating means heats the slurry without introducing any foreign substances into the slurry.

23. An apparatus as in claim 22, further comprising a cooling unit disposed proximately to an outer portion of the slurry disposed within the rotating vessel.

\* \* \* \* \*